US012700934B2

(12) United States Patent
O'Shea et al.

(10) Patent No.: US 12,700,934 B2
(45) Date of Patent: Aug. 4, 2026

(54) PROCESSING OF COMMUNICATIONS SIGNALS USING MACHINE LEARNING

(71) Applicant: Virginia Tech Intellectual Properties, Inc., Blacksburg, VA (US)

(72) Inventors: Timothy James O'Shea, Arlington, VA (US); Thomas Charles Clancy, III, Arlington, VA (US)

(73) Assignee: Virginia Tech Intellectual Properties, Inc., Arlington, VA (US)

( * ) Notice: Subject to any disclaimer, the term of this patent is extended or adjusted under 35 U.S.C. 154(b) by 631 days.

(21) Appl. No.: 18/140,018

(22) Filed: Apr. 27, 2023

(65) Prior Publication Data

US 2024/0080120 A1      Mar. 7, 2024

Related U.S. Application Data

(63) Continuation of application No. 17/339,033, filed on Jun. 4, 2021, now Pat. No. 11,664,910, which is a
(Continued)

(51) Int. Cl.
H04B 17/391          (2015.01)
G06N 3/045          (2023.01)
(Continued)

(52) U.S. Cl.
CPC ......... H04B 17/3912 (2015.01); G06N 3/045 (2023.01); G06N 5/046 (2013.01);
(Continued)

(58) Field of Classification Search
CPC ...... G06N 20/00; G06N 3/045; G06N 3/0455; G06N 3/0464; G06N 3/08; G06N 3/082;
(Continued)

(56) References Cited

U.S. PATENT DOCUMENTS 10,396,919 B1      8/2019  O'Shea et al.
10,541,765 B1      1/2020  O'Shea et al.
(Continued)

OTHER PUBLICATIONS

Abadi et al., "Tensorflow: large-scale machine learning on heterogeneous systems," Nov. 2015, arXiv preprint, 19 pages.
(Continued)

*Primary Examiner* — Nguyen T Vo
(74) *Attorney, Agent, or Firm* — Fish & Richardson P.C.

(57)          ABSTRACT

One or more processors control processing of radio frequency (RF) signals using a machine-learning network. The one or more processors receive as input, to a radio communications apparatus, a first representation of an RF signal, which is processed using one or more radio stages, providing a second representation of the RF signal. Observations about, and metrics of, the second representation of the RF signal are obtained. Past observations and metrics are accessed from storage. Using the observations, metrics and past observations and metrics, parameters of a machine-learning network, which implements policies to process RF signals, are adjusted by controlling the radio stages. In response to the adjustments, actions performed by one or more controllers of the radio stages are updated. A representation of a subsequent input RF signal is processed using the radio stages that are controlled based on actions including the updated one or more actions.

20 Claims, 8 Drawing Sheets

Related U.S. Application Data continuation of application No. 16/744,369, filed on Jan. 16, 2020, now Pat. No. 11,032,014, which is a continuation of application No. 16/549,011, filed on Aug. 23, 2019, now Pat. No. 10,541,765, which is a continuation of application No. 15/978,920, filed on May 14, 2018, now Pat. No. 10,396,919.

(60) Provisional application No. 62/505,219, filed on May 12, 2017.

(51) Int. Cl.

| | |
| --- | --- |
| *G06N 5/046* | (2023.01) |
| *G06N 20/00* | (2019.01) |
| *H04B 17/10* | (2015.01) |
| *H04B 17/24* | (2015.01) |
| *H04B 17/373* | (2015.01) |
| *H04L 25/02* | (2006.01) |
| *H04L 25/03* | (2006.01) |

(52) U.S. Cl.

CPC ........... *G06N 20/00* (2019.01); *H04B 17/101* (2015.01); *H04B 17/373* (2015.01); *H04B 17/3913* (2015.01); *H04L 25/0252* (2013.01); *H04L 25/03165* (2013.01); *H04B 17/24* (2015.01); *H04L 2025/03464* (2013.01)

(58) Field of Classification Search

CPC ...... G06N 3/0895; G06N 3/092; G06N 5/046; H04B 17/101; H04B 17/24; H04B 17/373; H04B 17/3912; H04B 17/3913; H04L 2025/03464; H04L 25/0252; H04L 25/0254; H04L 25/03165

See application file for complete search history.

(56) References Cited

U.S. PATENT DOCUMENTS

| | | | | |
| --- | --- | --- | --- | --- |
| 10,885,432 | B1* | 1/2021 | Dulac-Arnold | ........ G06N 3/006 |
| 11,032,014 | B2 | 6/2021 | O'Shea et al. | |
| 11,664,910 | B2 | 5/2023 | O'Shea et al. | |
| 2007/0168315 | A1 | 7/2007 | Covannon | |
| 2009/0149136 | A1* | 6/2009 | Rofougaran | ............. H03H 7/38 |
| | | | | 455/77 |
| 2013/0031036 | A1 | 1/2013 | Kojima | |
| 2015/0078493 | A1* | 3/2015 | Yu | ......................... H04W 24/02 |
| | | | | 375/346 |
| 2016/0026922 | A1 | 1/2016 | Vasseur et al. | |
| 2016/0248501 | A1* | 8/2016 | Froc | ..................... H04B 10/272 |
| 2017/0076201 | A1* | 3/2017 | van Hasselt | ............. G06N 3/08 |
| 2018/0091336 | A1 | 3/2018 | Mody et al. | |
| 2018/0159231 | A1* | 6/2018 | Barnickel | .............. H01Q 13/06 |
| 2018/0164756 | A1 | 6/2018 | Yamaguchi | |
| 2019/0014488 | A1 | 1/2019 | Tan et al. | |
| 2019/0149425 | A1 | 5/2019 | Larish et al. | |
| 2019/0302232 | A1 | 10/2019 | Harrison | |
| 2020/0065672 | A1 | 2/2020 | Osband et al. | |
| 2020/0073834 | A1 | 3/2020 | Hagdahl et al. | |
| 2020/0266910 | A1 | 8/2020 | O'Shea et al. | |
| 2021/0119881 | A1 | 4/2021 | Shirazipour et al. | |
| 2021/0367690 | A1 | 11/2021 | O'Shea et al. | |

OTHER PUBLICATIONS

Bergstra et al., "Teano: a CPU and GPU math expression complier in Python," In Proceedings of the Python for Scientific Computing Conference (SciPy), Jun. 2010, 7 pages.

Duan et al., "Benchmarking deep reinforcement learning for continuous control," Proceedings of the 33rd International Conference on Machine Learning, Jun. 19-Jun. 24, 2019, 14 pages.

Github.com [online], "Keras: The Python Deep Learning Library," available on or before Aug. 8, 2015, via Internet Archive: Wayback Machine URL <https://web.archive.org/web/20150808191544/https://github.com/fchollet/keras>, retrieved on Jul. 26, 2018, URL <https://github.com/fchollet/keras>, 39 pages.

Hausknecht et al., "Deep recurrent q-learning with double q-learning," Association for the Advancement of Artificial Intelligence, Department of Computer Science the University of Texas at Austin, Sep. 23, 2015, 7 pages.

Kingma et al., "Adam: a method for stochastic optimization," ICLR Conference, May 7, 2015, 15 pages.

Mnih et al., "Playing atari with deep reinforcement learning," NIPS Deep Learning Workshop, Dec. 19, 2013, 9 pages.

O'Shea et al., "Deep Reinforcement Learning Radio Control and Signal Detection with Kerlym: keras reinforcement learning gym agents," Virginia Polytechnic Institute and State University, May 30, 2016, 7 pages.

O'Shea et al., "Convolutional radio modulation recognition networks," International Conference on Engineering Applications of Neural Networks, Aug. 19, 2016, 9 pages.

Silver et al., "Mastering the game of go with deep neural networks and tree search", Nature, Jan. 28, 2016, 529(7587):484-489.

Sutton's Reinforcement Learning: An Introduction, 2nd ed., Mar. 1998, 352 pages.

Van Hasselt et al., "Deep reinforcement learning with double q-learning," Google DeepMind, Mar. 2, 2016, 13 pages.

\* cited by examiner

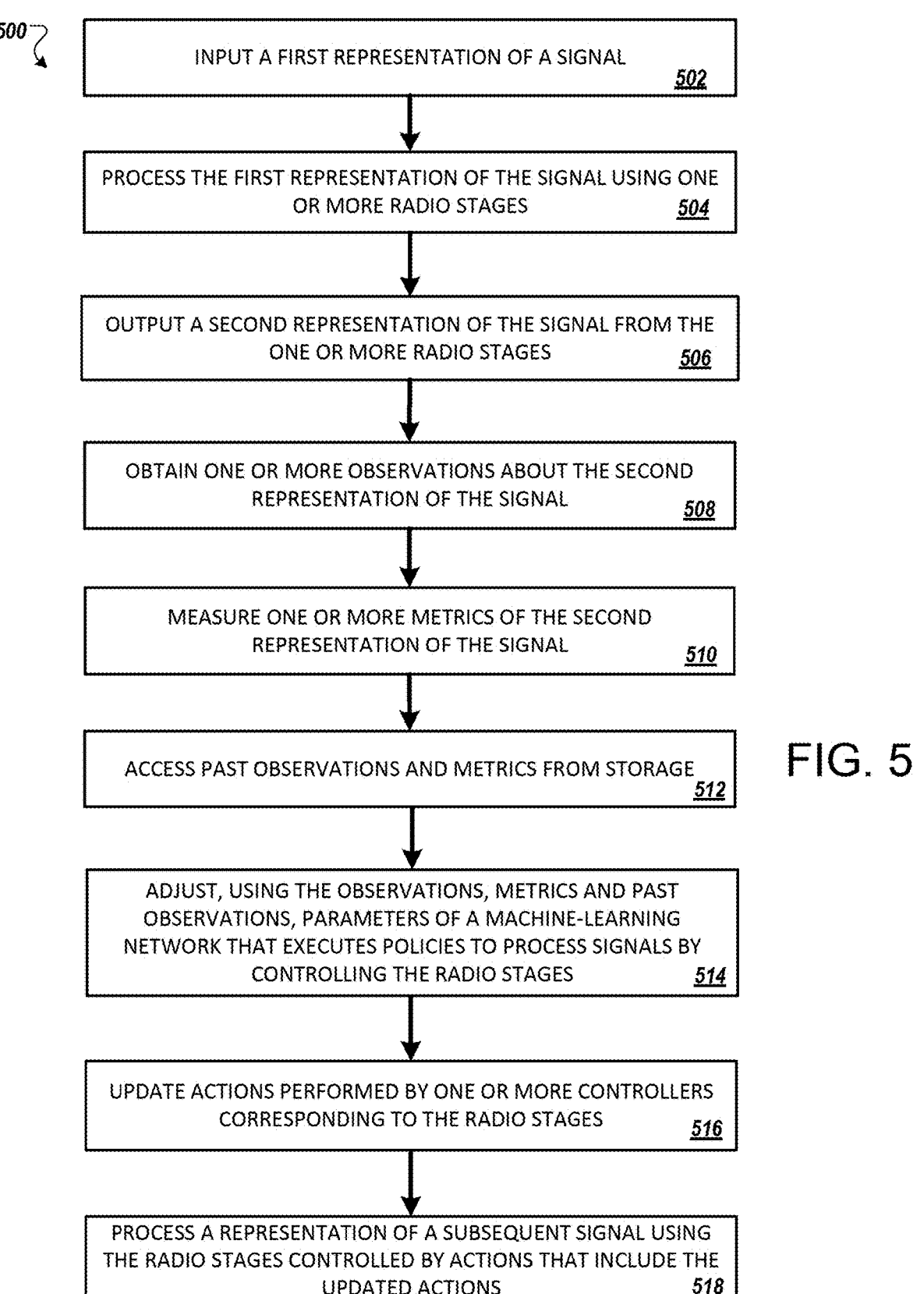

500

INPUT A FIRST REPRESENTATION OF A SIGNAL    <u>502</u>

PROCESS THE FIRST REPRESENTATION OF THE SIGNAL USING ONE OR MORE RADIO STAGES    <u>504</u>

OUTPUT A SECOND REPRESENTATION OF THE SIGNAL FROM THE ONE OR MORE RADIO STAGES    <u>506</u>

OBTAIN ONE OR MORE OBSERVATIONS ABOUT THE SECOND REPRESENTATION OF THE SIGNAL    <u>508</u>

MEASURE ONE OR MORE METRICS OF THE SECOND REPRESENTATION OF THE SIGNAL    <u>510</u>

ACCESS PAST OBSERVATIONS AND METRICS FROM STORAGE    <u>512</u>

ADJUST, USING THE OBSERVATIONS, METRICS AND PAST OBSERVATIONS, PARAMETERS OF A MACHINE-LEARNING NETWORK THAT EXECUTES POLICIES TO PROCESS SIGNALS BY CONTROLLING THE RADIO STAGES    <u>514</u>

UPDATE ACTIONS PERFORMED BY ONE OR MORE CONTROLLERS CORRESPONDING TO THE RADIO STAGES    <u>516</u>

PROCESS A REPRESENTATION OF A SUBSEQUENT SIGNAL USING THE RADIO STAGES CONTROLLED BY ACTIONS THAT INCLUDE THE UPDATED ACTIONS    <u>518</u>

FIG. 5

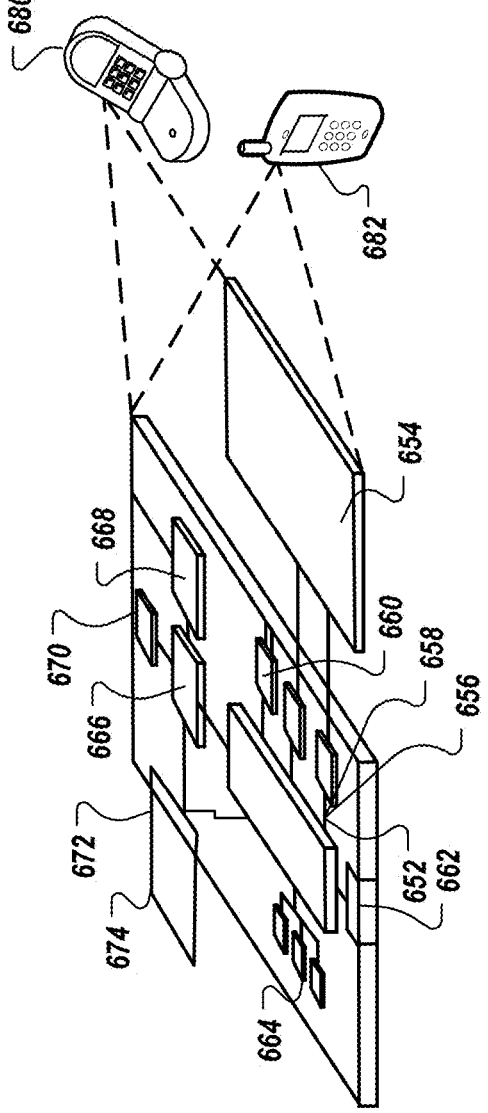
FIG. 6B

PROCESSING OF COMMUNICATIONS SIGNALS USING MACHINE LEARNING

CROSS-REFERENCE TO RELATED APPLICATIONS

This application is a continuation of U.S. patent application Ser. No. 17/339,033 filed Jun. 4, 2021, now allowed, which is a continuation of U.S. patent application Ser. No. 16/744,369 filed Jan. 16, 2020, now U.S. Pat. No. 11,032, 014, which is a continuation of U.S. patent application Ser. No. 16/549,011 filed Aug. 23, 2019, now U.S. Pat. No. 10,541,765, which is a continuation of U.S. patent application Ser. No. 15/978,920, filed May 14, 2018, now U.S. Pat. No. 10,396,919, which claims priority to U.S. Provisional Application No. 62/505,219, filed on May 12, 2017. The disclosures of all these applications are considered part of, and are incorporated by reference in, the disclosure of this application.

TECHNICAL FIELD

The present disclosure relates to using machine learning to process communications signals, and in particular radio frequency (RF) signals.

BACKGROUND

RF waveforms are prevalent in many systems for communication, storage, sensing, measurements, and monitoring. RF waveforms are transmitted and received through various types of communication media, such as over the air, under water, or through outer space. In some scenarios, RF waveforms transmit information that is modulated onto one or more carrier waveforms operating at RF frequencies. In other scenarios, RF waveforms are themselves information, such as outputs of sensors or probes. Information that is carried in RF waveforms is typically processed, stored, and/or transported through other forms of communication, such as through an internal system bus in a computer or through local or wide-area networks.

SUMMARY

In general, the subject matter described in this disclosure can be embodied in methods, apparatuses, and systems for training and deploying machine-learning networks to control processing of communications signals sent over RF channels.

In one aspect, one or more processors control processing of radio frequency (RF) signals using a machine-learning network. The one or more processors receive, as input to a radio communications apparatus, a first representation of an RF signal. The first representation of the RF signal is processed using one or more radio stages of the radio communications apparatus. In response to the processing, the one or more processors output a second representation of the RF signal from the one or more radio stages. The one or more processors obtain one or more observations about the second representation of the RF signal and measure one or more metrics of the second representation of the RF signal. The one or more processors access past observations and metrics from a storage coupled to the radio communications apparatus. The one or more processors adjust, using (i) the one or more observations, (ii) the one or more metrics and (iii) the past observations and metrics that are accessed from the storage, parameters of a machine-learning network that implements one or more policies to process RF signals by controlling the one or more radio stages. In response to adjusting the parameters of the machine-learning network, the one or more processors update one or more actions performed by one or more controllers corresponding to the one or more radio stages, wherein a controller performs actions to control a respective radio stage. The one or more processors process a representation of a subsequent RF signal input to the radio communications apparatus using the one or more radio stages that are controlled based on actions that include the updated one or more actions.

Particular implementations of the above aspect may include one or more of the following features. Updating the one or more actions may include: executing the one or more policies with adjustments in response to adjusting the parameters of the machine-learning network; obtaining, as a result of executing the one or more policies with the adjustments, an updated prediction of a next action to be taken by the one or more controllers; and providing the next action to the one or more controllers. Obtaining the updated prediction of the next action may include obtaining an updated prediction of a next action that is expected to achieve a target value for at least one metric of the one or more metrics. The updated prediction may be distinct from a prediction that would have been obtained as a result of executing the one or more policies without the adjustments.

Obtaining the updated prediction of the next action may include: determining, from a group of available actions, a particular action that is expected to minimize a difference between a current value of at least one metric of the one or more metrics and a target value of the at least one metric; and selecting the particular action as the next action. At a first time, a first updated prediction of a next action may be obtained, wherein the first updated prediction is based on a first set of past observations and metrics that are accessed from the storage, wherein the first updated prediction is expected to result in a first difference between a current value of the at least one metric and the target value; and at a second time subsequent to the first time, a second updated prediction of a next action may be obtained, wherein the second updated prediction is based on a second set of past observations and metrics that are accessed from the storage, wherein the second updated prediction is expected to result in a second difference between a current value of the at least one metric and the target value, the second difference being smaller than the first difference, and wherein the second set of past observations and metrics is larger than the first set of past observations and metrics.

The machine-learning network may include an artificial neural network (ANN). Adjusting parameters of the machine-learning network may include updating at least one of: a connectivity in one or more layers of the ANN, or a weight of connection in one or more layers of the ANN.

Adjusting parameters of the machine-learning network may include adjusting parameters of the machine-learning network using at least one of reinforcement learning, Deep Q-Learning, Double Q-Learning, policy gradients, or an actor-critic method. The machine-learning network may include at least one of a deep dense neural network (DenseNN) or a convolutional neural network (ConvNN) comprising a series of parametric multiplications, additions, and non-linearities. Updating the one or more actions may include determining, from a group of available actions, the one or more actions using at least one of a greedy learning process, or a soft learning process.

The one or more observations may include at least one of power spectrum estimates, cyclic features, time domain samples, current controller settings, historical information, or different forms of the second representation of the RF signal. The one or more metrics may include number of signals found, signal to noise ratio, information about types of signals, information about users of the radio communications apparatus, or information about signal contents.

The one or more observations may include channel response, power spectrum, time domain signal, spatial information about transmitters and receivers, current controller settings, historical information, information describing the first representation of the RF signal, or information describing the second representation of the RF signal. The one or more metrics may include bit error rate (BER), frame error rate (FER), symbol error distance, multi-user throughput, packet drop rate, spectral efficiency, quality statistics of a radio communications channel, or performance of the radio communications channel.

Other implementations of this and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions. The apparatuses may include a wireless router, a wireless access point, a cellular phone, a cellular base station, or a software radio.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

4

FIG. 5 is a flowchart illustrating an example method for controlling processing of an RF signal using a machine-learning network.

Figure 6A:
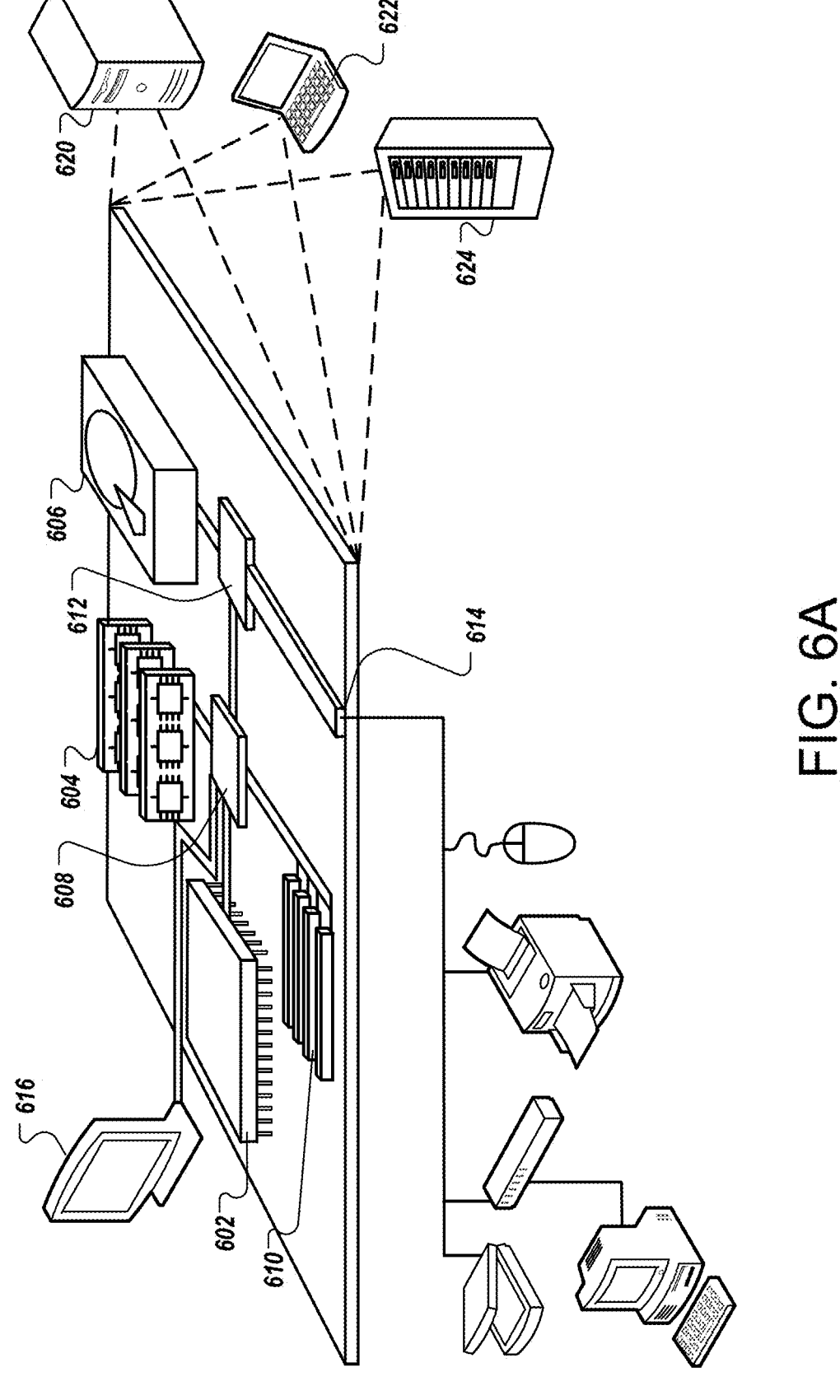

FIGS. 6A and 6B are diagrams illustrating examples of a computing device and a mobile computing device, respectively, that can control processing of an RF signal using a machine-learning network.

Like reference numbers and designations in the various drawings indicate like elements.

DETAILED DESCRIPTION

Techniques are disclosed herein for learning and controlling parameters and operating strategies of radio communications systems. The disclosed techniques employ machine learning that use training methodologies, e.g., reinforcement learning, to control radio signal processing hardware and respond to stimuli to optimize the operation of radio systems for specific radio system tasks. A radio communications system employing these techniques learns optimal or near-optimal policies for controlling radio hardware settings to perform a range of tasks, such as frequency selection, gain control, or other amplifier and filter stage parameter selection. In some implementations, the system accumulates experience over multiple iterations of exploration, developing reward-seeking policies that attempt to accomplish certain objectives, e.g., fastest signal detection, most robust signal detection, identification or reception of a radio signal, low bit error rate, low power, low bandwidth, low complexity, optimal resource allocation (for single users, or multiple users, or both), robust performance in well in particular regimes such as at low signal to noise (SNR) ratio channels or under specific types of fading or interference, among other criteria. In some implementations, the objectives correspond to historical objectives that are learned by the system based on the accumulated experiences. Using historical observations from the accumulated experiences, policies are developed or adjusted to optimize for such historical rewards. In this context, optimizing for rewards refers to parameter configuration adjustments of the radio hardware that are intended to achieve certain objectives, e.g., target values of one or more metrics of the communications signals. In doing so, the radio communications system can adaptively learn to take intelligent search and radio control actions autonomously. The objectives include, for example, utilizing limited computing resources to efficiently process signal information to minimize detection time for certain types of signals, identify certain types of bursts to extract in the wideband, or maximize resource utilization for aggregate multi-user capacity, among others.

In conventional approaches, tasks such as radio spectrum search, signal detection, receiver tuning and hardware optimization are done manually, e.g., by a human operator, or a simple state machine-based automated method (e.g. scanning through settings or channels iteratively in a pre-programmed manner that does not learn, improve or change from experience). In such cases, an operator may select, through trial and error, an operating frequency on a hardware oscillator and mixer device, a combination of gain settings and/or attenuation settings on a programmable gain amplifier or programmable attenuator, a combination of filter settings, and potentially a large number of manually set or tuned parameters within a radio receiver and digitizer hardware device, to receive a signal with minimum distortion. Often, experienced expert operators are rare, expensive, not scalable to a large number of instances, or not methodical, quantitative and predictable. In contrast to such conventional approaches, the implementations disclosed herein provide for autonomously training, optimizing and deploying a radio communications system and method for controlling the radio hardware components in a radio signal processing system, such as a sensing system or a radio communications system, to achieve target objectives.

The disclosed implementations present a novel approach to how radio communications systems are designed and deployed for radio communications applications. For example, the disclosed implementations may help improve a slow and incremental conventional process of radio signal engineering that does not scale well (e.g., due to use of human operators, as noted above), and instead enable a new way of designing, constructing, and realizing radio communications systems. The policies employed by these radio communications systems include policies realized by machine-learning networks that are trained to learn suitable radio signal sensing or radio signal generation parameters for different types of communication media. In doing so, the radio communications systems offer various advantages, such as rapid adaptation, self-optimization, improved power, resiliency, and complexity advantages over presently available systems. This can be especially important for communications channels that have very complex sets of effects that are hard to model, have a large number of operating configurations, conditions or modes, or are hard to optimize for using other approaches, e.g., wireless or cellular communications channels.

The implementations disclosed herein can be applied to a wide range of radio communication systems, such as cellular, satellite, optical, acoustic, physical, emergency hand-held, broadcast, point-to-point, Wi-Fi, Bluetooth, and other forms of radio systems, including channels that undergo transmission impairments. Channel impairments can include, for example, thermal noise, such as Gaussian-like noise, multi-path fading, impulse noise, spurious or continuous jamming, interference, distortion, hardware effects, and other impairments.

The system may implement techniques to control radio hardware that are learned from one or more machine-learning networks that have been trained to select from a range of suitable policies that govern actions performed by the radio control hardware based on one or more objective criteria. In some implementations, the machine-learning networks are artificial neural networks (ANNs). During training, the machine-learning networks may be adapted through selection of model architecture, weights, and parameters in the encoder and/or the decoder to learn encoding and decoding mappings.

In some implementations, a machine-learning network is trained to perform unsupervised, or partially supervised, machine learning to determine techniques to process RF signals for transmission, or reception, or both, or to identify RF signals present in detection power spectra. Therefore, in some scenarios, rather than being reliant upon pre-designed systems for signal tuning, mode selection or identification of received RF signals, the disclosed implementations adaptively learn techniques for processing information in RF waveforms that are transmitted or received over a channel, as well as techniques for identifying RF waveforms in detection emissions. The machine-learning network may be trained on real or simulated channel conditions. Radio communications apparatus or systems that utilize results of training such machine-learning networks can be further updated during deployment, thus providing advantages in adapting to different types of wireless system requirements, which can result in improvements to throughput, error rate, acquisition time, resilience, flexibility, complexity, and power consumption performance of such systems. Depending on the configuration of the training system and data sets, simulators and/or channel models used, such machine-learning communication techniques can specialize in performance for a narrow class of conditions, signal band or channel types, or may generalize and optimize performance for a wide range of signal, band or channel types or mixtures of one or more signals, bands or channels.

Figure 1:
FIG. 1 illustrates an example of a radio communications system that uses machine learning to adjust actions taken by radio controllers to process RF communications signals.

FIG. 1 illustrates an example of a radio communications system 100 that uses machine learning to adjust actions taken by radio controllers to process RF communications signals. The system 100 includes one or more radio stages, collectively referred to as radio stages 109, which are controlled by one or more controllers, collectively referred to as controllers 119. The system 100 further includes a storage 130, observations and rewards 131, policy optimization 132, policies 133 and action selection 134.

In some implementations, the system 100 is an apparatus, such as a hardware electronic device or an embedded software radio, which includes the radio stages 109, the controllers 119, storage 130, observations and rewards 131, policy optimization 132, policies 133 and action selection 134, as combinations of one or more hardware components, or software components, or both. For example, the system 100 is a wireless device, such as a cellular phone or an access point, in some cases. In some implementations, the system 100 includes multiple different hardware electronic devices or embedded software radios that are connected to one another, each of which includes one or more of the radio stages 109, the controllers 119, storage 130, observations and rewards 131, policy optimization 132, policies 133 and action selection 134. For example, in some cases, the system 100 is a cellular base station resource block scheduler that includes multiple different hardware and software components. For example, the cellular base station can leverage reinforcement learning by the machine-learning network to optimize resource allocation, resource scheduling, and prioritization of physical radio parameters.

As shown in FIG. 1, an RF signal (RF In) input to the system 100 is processed by the radio stages 109 based on actions by the controllers 119, to produce output information 108. In some implementations, the radio stages 109 include one or more of the following components, which can be a hardware (e.g., tuning or filtering) or instructions executed in a processor (e.g., synchronization, demodulation, or modulation, among others). Each radio stage is controlled by a corresponding controller of the controllers 119. For example, the radio stages 109 include a radio antenna 101, which is controlled by a corresponding antenna controller 111 that selects one or more antenna parameters, such as the antenna's azimuth, elevation, other geometry, impedance matching, antenna port, or other antenna operating characteristics which receives RF In. As described below, actions taken by the antenna controller 111 to select one or more of these parameters is adjusted based on adjustments to the policies 133.

The radios stages 109 and corresponding controllers 119 also include a filter selection 102 hardware component, which is controlled by a filter selection controller 112; a set of programmable gain amplifiers and/or attenuators 103, which are controlled by gain and attenuation controllers 113; a tuner 104 (which can include, e.g., an oscillator and a mixer, or multiple stages of oscillators and mixers, in the case of non-direction-conversion), for which the oscillator frequency and other settings are controlled by tuner controller 114; and an analog to digital converter (ADC) 105, which converts the tuned signal to a digital representation (in some implementations, after an optional additional set of filters and/or amplifiers/attenuators), where an ADC settings controller 115 controls the operating parameters of the ADC 105. In some implementations, the radio stages 109 also includes a digital down converter 106, which uses a set of digital signal processing algorithms to perform digital down conversion, e.g., providing additional tuning and filtering. The digital down converter is controlled by a digital pre-processor parameter controller 116, which selects operating parameters and modes for the down-conversion.

Upon processing by the radio stages above, a received digital signal 107 is produced, e.g., either as a raw signal representation, or some processed version of the signal, such as through a demodulator, detector, classifier, or other signal processing algorithm(s). A waveform controller 117 controls the modem-operating mode and operating parameters of the signal processing algorithm(s). Following processing by the signal processing algorithm(s), output information 108 is produced, which is intended for use by other downstream systems or users.

In some implementations, the output information 108 is improved by optimal control and tuning of various radio stages 109 by the set of controllers 119, which may change, e.g., the operating modes, parameters, or settings of the radio stages. In such implementations, the output information 108 is used, in addition to being sent to other systems, to produce observations 131 about RF In, and results in accumulation of rewards 131 based on a mission and application specific radio task that is being performed, e.g., as described in greater detail below with respect to FIG. 3.

In some implementations, observations and rewards 131 over multiple iterations, and actions that are taken by the radio controllers 119 corresponding to the observations and rewards, are stored as historical information and traces in storage 130, e.g., a database, as the system 100 learns and experiments over time. During one iteration, the system 100 provides as input the present observations and rewards 131, and the historical information obtained from the storage 130, to a set of policies 133, which predicts the next action(s) (e.g., optimal actions) to be taken by one or more of the controllers 119 to produce the best reward. In some cases, the storage 130 is implemented in memory, such as random access memory (RAM), read-only memory (ROM), non-volatile memory such as flash memory, or hard disk memory. In some implementations, the policies 133 predict the good-ness, or utility, of the next action(s) to achieve the best reward. Based on the prediction, an action selection com-ponent 134 selects the optimal actions and provides them to the target controllers that are to be adjusted, to adjust the processing performed on RF In. In subsequent iterations, the system 100 continues to map observations 131 through the set of policies 133, to determine actions that are provided by action selection 134 to one or more of the controllers 119. For example, in some implementations, in response to current or predicted channel conditions (e.g. rate adaptation to appropriate encoding schemes) determined by the policies 133, actions to tune the radio stages 109 to particular modulation and coding modes, or autoencoder encoding or decoding configurations, are selected by action selection 134.

In some implementations, a policy optimization routine 132 is run offline or online during deployment of the system 100. The policy optimization routine 132 uses the prior experience by the system 100, e.g., the historical informa-tion and traces obtained from the storage 130, and one or more methods to develop, improve and/or optimize the set of policies 133. The policies 133 include, for example, action-value policies, which estimate the predicted reward and/or next state given by each action; and state-value policies, which predict the potential future rewards given by each state. In this context, "state" means the current status of objects, emitters, locations, propagation effects and other effects within the environment, along with the current obser-vations and configuration and operation modes of some or all of the radio stages 109. The policies 133 also include advantage policies, which estimate only the difference in reward among various actions. In some implementations, the policies 133 also include a number of prediction models, which predict the next state given the current state. In some implementations, the prediction models include predicted effects of the next action. For example, emitters often follow predictable emission patterns that can be modeled and predicted and may not be effected by the actions taken by the receiver. In some implementations, the prediction models exclude the predicted effects of the next action.

In some implementations, one or more of the policies 133, policy optimization 132 and action selection 134 are imple-mented as: hardware routines, e.g., firmware embedded in one or more integrated circuits, microcontrollers, or field programmable gate arrays (FPGAs); or as software routines, e.g., instructions stored in memory (e.g., flash memory) that are executed by one or more processors; or a combination of both.

In some implementations, the policies 133, or the policy optimizations 132, or both, are implemented as machine-learning networks or other parametric models, in which the parameters are updated through policy optimization. This process can involve policy iteration, e.g., in which experi-ences are replayed to compute and minimize the distance between predicted rewards and actual rewards using a method such as gradient descent or evolutionary parameter selection, thereby improving the accuracy with which policy functions reflect the operating environment.

In some implementations, the machine-learning networks that implement the policies 133 and/or the policy optimiza-tions 132 include ANNs, which consist of one or more connected layers of parametric multiplications, additions, and non-linearities. In such implementations, updating the machine-learning networks include updating weights of the ANN layers, or updating connectivity in the ANN layers, or other modifications of the ANN architecture, so as to modify the actions selected by action selection 134.

Figure 1A:
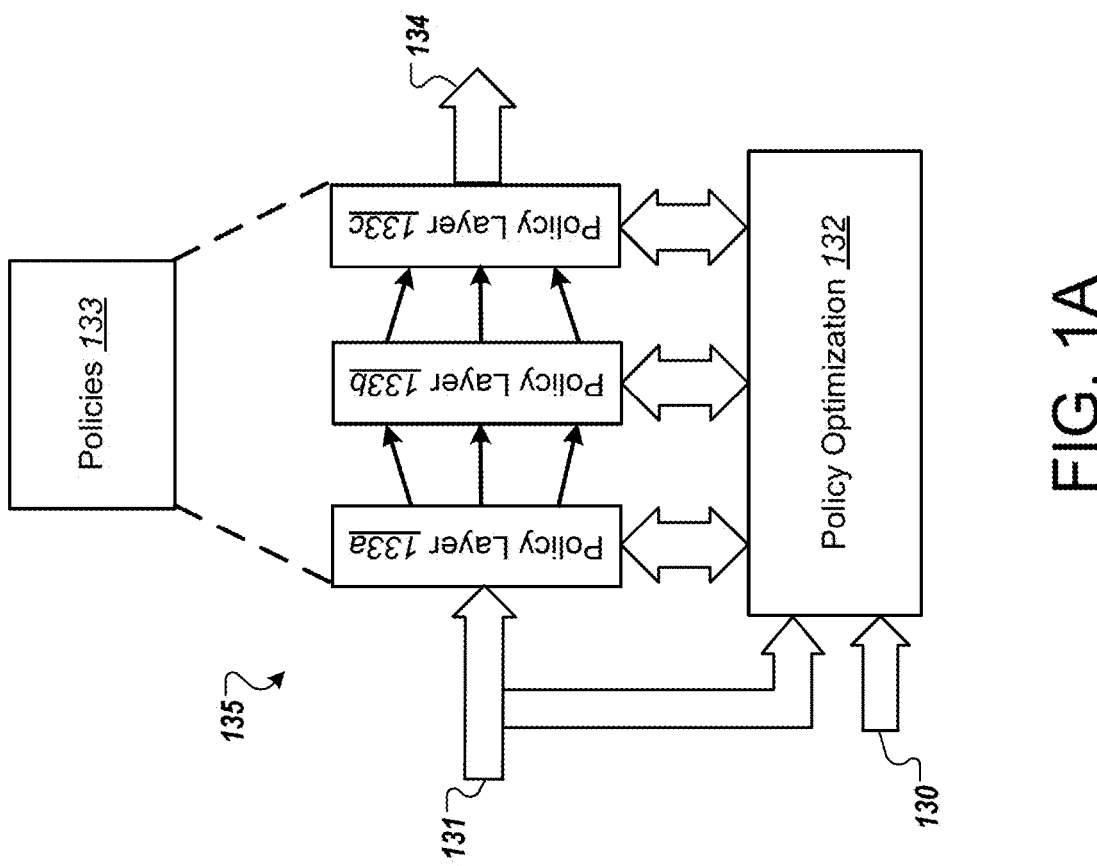
FIG. 1A illustrates an example of a network structure of a machine-learning policy network that may be implemented in an RF communications system to implement policies for radio controller action selection.

FIG. 1A illustrates an example of a network structure 135 of a machine-learning policy network that may be imple-mented in an RF communications system to implement policies for radio controller action selection. As shown, the network structure 135 is an ANN that executes the policies 133.

The network structure 135 uses one or more policy layers, e.g., policy layers 133a, 133b and 133c, to form an ANN that executes policies 133. Each policy layer includes one or more artificial neurons. The output of each policy layer is used as input to the next policy layer. For example, the output of policy layer 133a is used as input to policy layer 133b. Each layer of the ANN generates an output from a received input in accordance with current values of a respec-tive set of parameters. For example, in some implementa-tions, the network 135 includes a plurality of policy layers that are collectively or iteratively trained.

The network input are observations and rewards 131 from the present actions taken by radio controllers to control their respective radio stages. The policy layers also communicate with policy optimization 132, which adjusts the connections between the policy layers (e.g., by adjusting the weights of the connections between neurons of different layers) based on the observations and rewards 131, and also using historical information, e.g., retrieved from storage 130. The network output corresponds to the action selection 134, e.g., actions predicted to be taken by the radio controllers to optimize the radio signal information for some specific reward, e.g., target objective.

In some implementations, during training, the network 135 is trained to learn optimal tuning techniques for communications over various types of RF channels. During deployment, the network 135, having been trained, manages selection of the actions by the controllers. For example, the network 135 may be configured as an autoencoder. In the scenario of an autoencoder structure, the network 135 is trained to learn best representations of information for communication over an RF channel.

In general, the network structure 135 may include one or more collections of multiplications, divisions, and summations or other operations of inputs and intermediate values, optionally followed by non-linearities (such as rectified linear units, sigmoid function, or otherwise) or other operations (e.g., normalization), which may be arranged in a feed-forward manner or in a manner with feedback and in-layer connections (e.g., a recurrent network, where sequences of training information may be used in some instances). Parameters and weight values in the network may be used for a single multiplication, as in a fully connected neural network, e.g., deep neural network (DNN), or they may be "tied" or replicated across multiple locations within the network to form one or more receptive fields, such as in a convolutional neural network, a dilated convolutional neural network, a residual network unit, or similar. The specific structure for the networks may be explicitly specified at design time, or may be selected from a plurality of possible architecture candidates to ascertain the best performing candidate.

In some implementations, the network structure 135 includes one or more layers that implement fixed communications algorithms, such as synchronization, equalization, etc. As such, in some scenarios, the network 135 may be trained and deployed to learn policies for suitable encoding and/or decoding techniques based on such fixed layers in the networks. Therefore, in general, the network structure 135 disclosed herein enables flexible design and training, for example by incorporating one or more existing communication algorithms that may be deployed in real-world systems in conjunction with machine-learning techniques to optimize around those fixed algorithms.

The example of FIG. 1A shows only one possible implementation of a network structure that may be used to implement policies. In some implementations, similar network structures are used to execute policy optimizations, e.g., policy optimization 132. In general, implementations are not limited to these specific types of network layers, and other configurations of layers and non-linearities may be used, such as dense, fully connected, and/or DNN layers, including rectified linear-unit (ReLU), sigmoid, tanh, and others. The network structure 135 uses these layers to predict an output 134 for a received input 131.

The network structure 135 may also include one or more channel modeling layers. In some instances, the channel modeling layers may have at least one of weight regularization on convolutional network layer weights, activity regularization on dense network layer activations, or other stochastic impairments on activations or weights, such as dropout. In some instances, or in addition to these, the layers may perform additional approximation of non-linearities present in a channel system (such as amplifier or RF component behaviors), or they may leverage variational layers such as sampling from a random distribution specified by or parameterized by weights or activations.

In some implementations, channel modeling layer(s) or simulators may model impairment effects in an RF channel, which may be include various types of impairments in an RF medium and/or transmission and reception components. Such channel modeling layers may be implemented during training of the network structure 135, in which case the channel modeling layer(s) may be implemented as one or more layers in an overall auto-encoder structure to represent impairment effects of the RF channel, including, in some cases, with a dynamic time-varying behavior to reflect the progression of modes, e.g., in a mobile or non-stationary real world environment. During evaluation or deployment over a real RF channels, the RF channel would be a real-world communication channel (including possible transmitter and/ or receiver effects), and the corresponding channel emulation layers would be removed from deployment, with the policy layers 133a, 133b and 133c being deployed to optimize the communications system over one or more real RF channels.

In general, however, channel emulation models and/or layers may be implemented in different parts of the communications system policy training architecture or network structure 135 for various reasons, such as to prevent over-fitting, such as by implementing dropout, weight or activity regularization penalties, encouraging minimum energy bases, or to implementing a penalty on dense layer activations to encourage sparsity of solutions typically intended to improve generalization of the system to unseen conditions, modes, responses or channel states or behaviors of the communications system in the RF environment.

In scenarios using stochastic models or layer(s) to simulate the RF channel during training, the network structure 135 may implement domain-specific regularization or stochastic sampling from channel distributions to model RF channel impairment effects. For example, regulation layer(s) may model different types of impairments that occur during over-the-air transmission in a wireless RF system, such as additive Gaussian thermal noise, random time and rate of arrival, random carrier frequency and phase, random fading and impulse response, hardware distortions, interference, delay spread or dispersion in the received signal, or sequences of different sets of channel modes, such as varying Doppler, delay spread, interference, noise levels, or other effects over time or location while simulating a progression through a simulated environment (e.g., effects are temporally correlated on a short scale, but non-stationary on a longer scale which may be predicted or optimized using measurements or pattern of life information (time/location) to optimize communications system control performance, mode selection or mode optimization). In some cases, the simulator may simulate various paths through an environment as well as all or some of the expected emitters, transceivers, impairments, interferers, or other channel effects that would be present when actually operating in this environment under realistic conditions for specific times, dates, events, or other phenomena. By simulating many such paths, conditions, or impairments experience for policy optimization may be obtained rapidly and in high volume, where real world experience or measurement might be costly, time consuming, or prohibitive. This simulated experience may be derived from real experience (e.g. augmentation), or may be predictive (e.g. simulation of a new building or region prior to construction/deployment), and/or may be combined with real data (e.g. using both simulated and real experience to drive the tasks of policy training with as much data as possible).

Such channel-modeling layers and/or regularizers, such as Gaussian noise and dropout, may be used during training and removed during evaluation or deployment over real channels. In radio communications, additive noise, such as Additive White Gaussian Noise (AWGN) may be modeled by adding a real-valued Gaussian random variable to different signal components, which may be signal basis functions (e.g., in-phase (I) and quadrature (Q) components), that are passed through the channel.

Channel-modeling layers may also be implemented to model unknown time and rate of arrival, for example by applying a random or a priori unknown shift and scaling in the time domain, which may model scenarios in which radio propagation times vary and clocks on distributed radio systems are not synchronized. These effects may be modeled, for example, by a random time shift and a random time-dilation rate that have Gaussian distributions. They may also be modeled by reproducing distributions measured by sounding a real communications channel for example in an environment of interest.

As other examples of channel-modeling layers, carrier frequency and phase offset may be modeled as rotations in signal components, which may be signal basis functions. In some implementations, sampling may be performed using complex baseband representations, in which case unknown offsets in center frequency and absolute phase of arrival due to unsynchronized oscillators on transmitter and receiver, as well as Doppler shift, may result in static or linear polar mixing of the different signal components. To simulate a real system and to improve generalization, such layers may randomly select a phase and a frequency offset, or a linear phase ramp based on an expected center frequency offset error due to independent drifting oscillators.

As yet another example of channel-modeling layers, delay spread in the received signal may be modeled to simulate the arrival of numerous delayed and phase shifted copies of a signal arriving at the receiver. Since this is often simulated as a linear system, with stability assumptions over a single sample time window for many specific communications modes, a random non-impulsive channel delay spread filter may be chosen and convolved with the input signal to obtain an output which has been spread in time linearly according to a random channel response. This assumption is safe for smaller time-windows than the channel coherence time. When simulating longer temporal, spatial, or other paths through an environment, we may consider a sequence of modes or a progression of values beyond a single coherence time. In this case, the system may need to switch or adapt operation modes using the policy function in order to optimize for performance objectives as the requirements of the system change dynamically. This policy may be based on a mixture of reactive metrics (e.g., changing modes based on measured noise, SNR, or fading levels, among others) or it may be based on predictive metrics in some instances (e.g., predicted SNR changes based on location or time of day, delay spread based on location, among others).

Such delay spread and coherence time may vary in different types of communication systems, including wireline and space-based wireless systems which can sometimes have very short impulsive channel responses, or high frequency and dense multi-path wireless systems which can have long delay spreads. In some implementations, the delay spread is modeled as a regularization layer that implements one or more convolutions or filtering operations on the transmitted RF signal. In some cases, a simulator for the communications system may represent operation of one or more channel modes and distributions, and may simulate the progression of such modes over time, space, frequency, or otherwise leveraging information about the real world, statistical behavior, and channel effects in order to develop simulated experience and optimize policy functions.

In some implementations, the network structure 135 may be utilized with one or more fixed transmission and/or receiving techniques, and may adapt the policy layers 133a, 133b and 133c to learn encoding and decoding operations that are suitable for those fixed transmission/reception components or specific deployments or channel effects/geometries. For example, in some scenarios the network structure 135 may employ fixed filtering, sampling, modulation, equalization, subcarrier assignment, reference signal insertion, encoding, or other transmission/reception techniques, and may learn suitable network layer parameters or network structures that adapt the overall communication system to best utilize those fixed components (e.g., by changing parameters, scheduling, resource allocation, settings, modes, algorithms, or other configuration of signal processing functions or encoder/decoder networks).

A general design objective for the network structure 135 may be to obtain a desired performance, such as target values for one or more metrics, for the output information, e.g., output information 108, subject to other objectives or constraints. For example, certain realizations of the system may favor, as rewards, reduced power and/or bandwidth, other improved properties of the RF signals transmitted over the channel, or improved computational complexity. Accordingly, in this example, the metrics include power, bandwidth, and computational complexity, among others. The corresponding rewards or objectives include achieving certain target values for one or more of the power, bandwidth, and computational complexity, minimal time to an objective, optimal allocation of spectrum or time/frequency/spatial slots to users to maximize user utility and/or aggregate throughput or performance, among others. As such, the system may evaluate a trade-off between these objectives, which may be used in order to help determine the specific actions used for radio signal tuning, or other signal inference tasks.

Reverting to FIG. 1, in some implementations, during deployment, the machine-learning networks implementing the policy optimization 132 and/or policies 133 utilize simplified techniques based on results of training the machine-learning networks. For example, the policy optimization 132 and/or policies 133 may utilize approximations or compact look up tables based on the learned techniques. In such deployment scenarios, the policy optimization 132 and/or policies 133 may implement more simplified structures, rather than a full machine-learning network. Techniques such as distillation may be used to train smaller networks which perform the same signal processing function.

In some implementations, the policy optimization 132 and/or policies 133 include one or more fixed components or algorithms that are designed to facilitate communication over RF channels, such as expert synchronizers, equalizers, etc. As such, during training, the policy optimization 132 and/or policies 133 in such implementations are trained to learn techniques that are suitable for such fixed components or algorithms.

RF signals that are processed by system 100 include any suitable radio-frequency signal, such as acoustic signals, optical signals, or other analog waveforms. The spectrum of RF signals that are processed by system 100 may be in a range of 1 kHz to 300 GHz. For example, such RF signals include very low frequency (VLF) RF signals between 1 kHz to 30 kHz, low frequency (LF) RF signals between 30 kHz to 300 kHz, medium frequency (MF) RF signals between 300 kHz to 1 MHz, high frequency (HF) RF signals between 1 MHz to 30 MHz, and higher-frequency RF signals up to 300 GHz.

Figure 2:
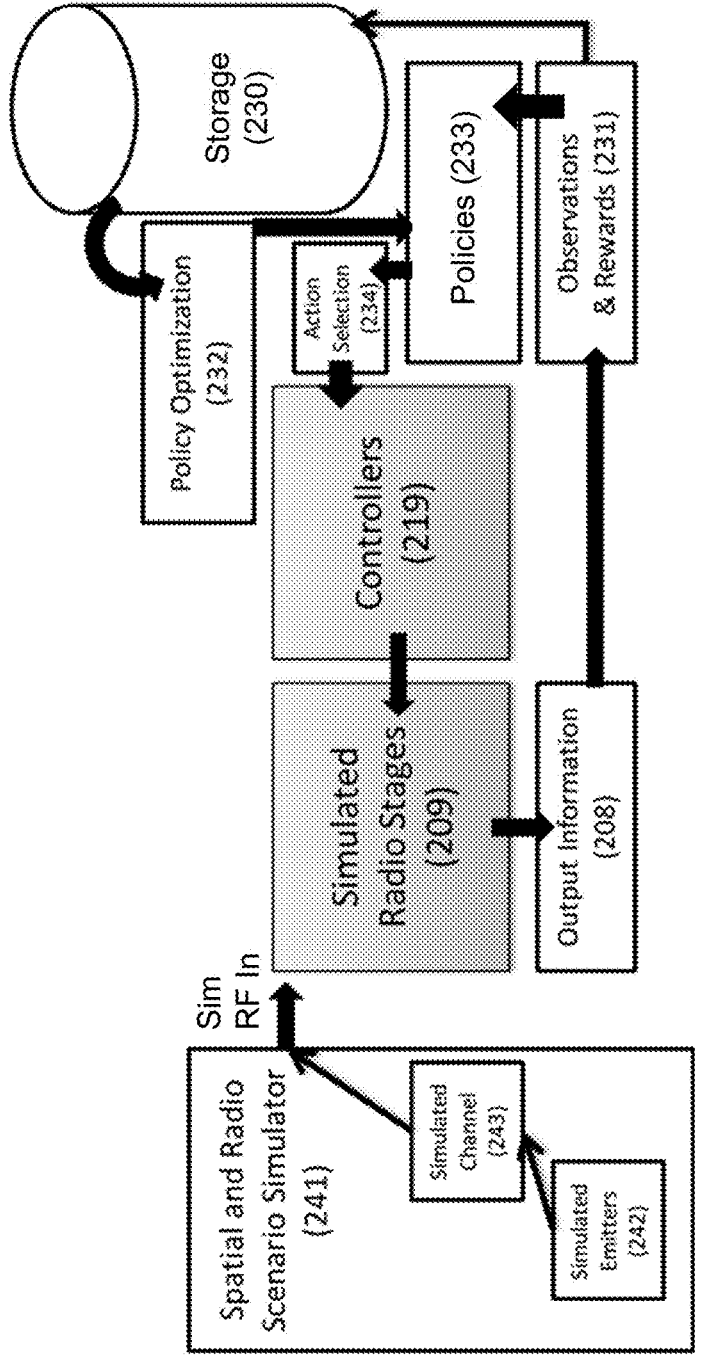
FIG. 2 illustrates an example of a radio communications system that uses a scenario simulator and simulated radio stages to train a machine-learning network.

FIG. 2 illustrates an example of a radio communications system 200 that uses a scenario simulator and simulated radio stages to train a machine-learning network. For example, in some implementations, the radio communications system 200 is used to train an ANN, such as the network 135, which executes policies 133.

As shown in FIG. 2, in the system 200, a spatial and radio scenario simulator 241 and simulated RF In, along with a set of simulated radio stages 209 replaces real world emitter and propagation scenarios and real world hardware and signals as were present in FIG. 1. A system trained on such an environment simulator can iterate very rapidly in simulation over billions of possible scenarios, instances, configurations, or potentials, which may occur rarely or slowly in the real-world scenarios. In some implementations, the scenario simulator closely replicates real-world behavior of emitters, signals, propagation effects, and effects and filtering imparted by the radio stages. In such implementations, the rest of the system 200 works similar to the system 100. For example, the set of simulated radio stages 209 produces a set of output information 208, which yields observations and rewards 231 that are stored in a storage 230 in each iteration. These are used by policy optimization 232 to adjust policies 233 to predict best actions for the target rewards in view of the observations. Based on the prediction by the policies 233, action selection 234 selects one or more best actions, which are used by one or more of the controllers 219 to update operations of the corresponding simulated radio stages 209. In some implementations, the simulated radio stages 209 are simulated versions of the radio stages 109, while the observations and rewards 231, storage 230, policy optimization 232, policies 233, action selection 234 and controllers 219 are respectively similar to observations and rewards 131, storage 130, policy optimization 132, policies 133, action selection 134 and controllers 119.

Since portions of the radio communications system 200 are simulated, e.g., simulated emitters 242 and simulated channel 243 of the spatial and radio scenario simulator, and the simulated radio stages 209, the policy optimization 232 can evaluate various policy permutations rapidly for a large number of scenarios or variations of one or more scenarios. The evaluations can be done in parallel, simulating many scenarios and radio stages concurrently. In such cases, distributed simulations can share the storage 230, or respective sets of policies 233 to accelerate the learning process. In some cases, the simulations can be done in an asynchronous or stochastic way to optimize for diversity and/or simulation speed.

Figure 3:
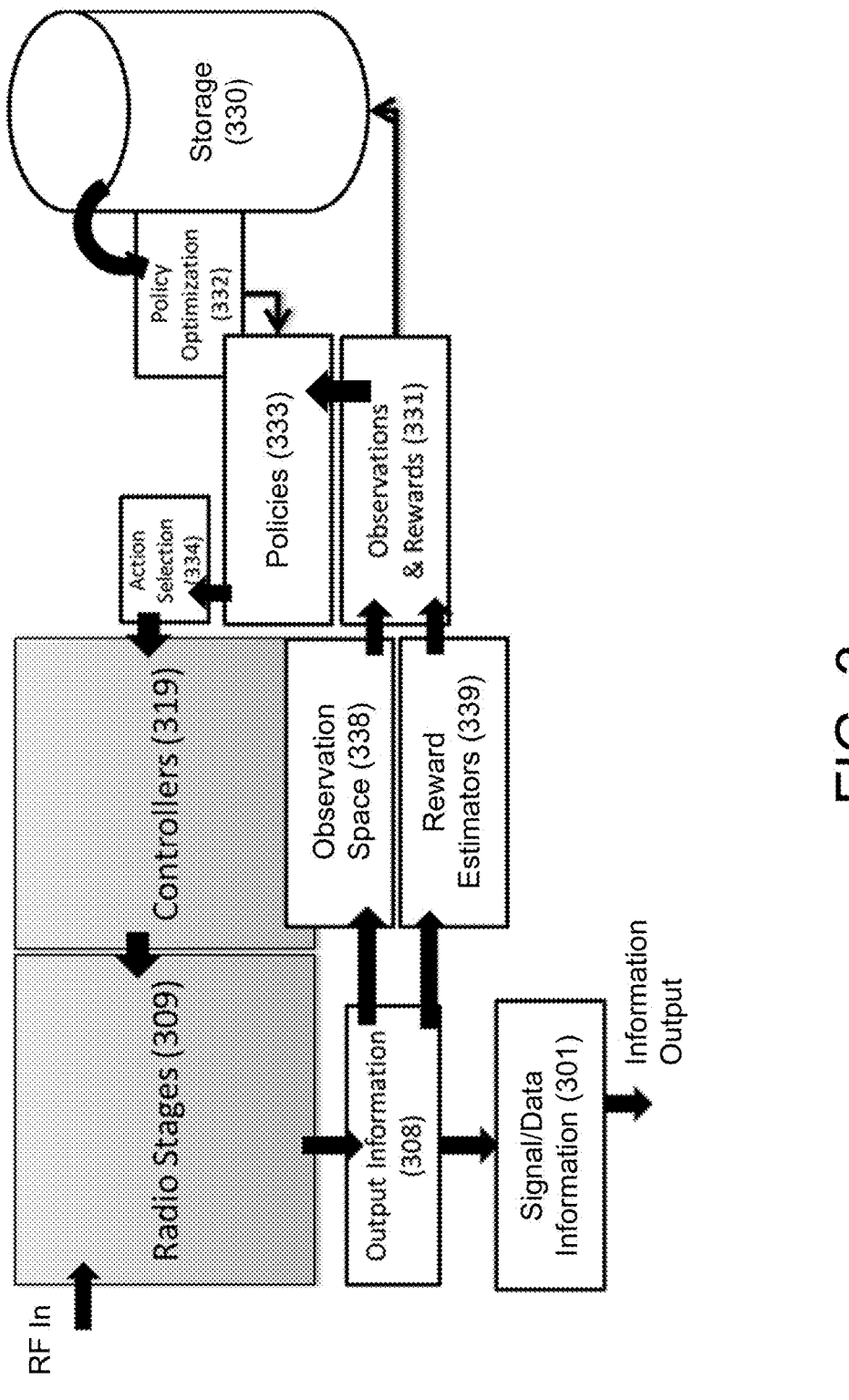
FIG. 3 illustrates an example of a radio communications system that uses machine learning to sense signals and emitters in the environment, or to receive transmitted RF signals, or both.

FIG. 3 illustrates an example of a radio communications system 300 that uses machine learning to sense signals and emitters in the environment, or to receive transmitted RF signals, or both. The system 300 includes various hardware and software components, such as one or more radio stages 309 that are controlled by one or more controllers 319; an observation space 338; reward estimators 339; observations and rewards 331; a storage 330; policy optimization 332; policies 333 and action selection 334.

In some implementations, the system 300 is similar to the system 100. In such cases, the one or more radio stages 309, controllers 319, observations and rewards 331, storage 330, policy optimization 332, policies 333 and action selection 334 are respectively similar to one or more radio stages 109, controllers 119, observations and rewards 131, storage 130, policy optimization 132, policies 133 and action selection 134.

As shown in FIG. 3, the system 300 receives an RF signal (RF In) as input, which is processed by the one or more radio stages 309 to produce output information 308. The output information 308 includes signal and/or data information 301, which is provided as information output, e.g., to another system or user.

In some implementations, the system 300 functions as a sensing system. In such implementations, the signal and/or data information 301 includes information about various signals and emitters in the environment, which form the objective output of the sensing system. Such implementations can be either in the real world (e.g., as in FIG. 1), or in a simulated environment (e.g., as in FIG. 2). In these implementations, the output information 308 also produces an observation space 338, which includes, for example, power spectrum estimates, cyclic features, time domain samples, current controller settings, historical information, or other forms of the processed RF signal. The output information 308 also produces a set of reward estimators 339, which include, for example, numbers of signals found, SNRs, the presence or type of electro-magnetic interference or distortion, information about the signal types, users, locations, access patterns, and/or contents, or other information describing the degree of goodness of the signal and/or data information 301, or the spectral usage or availability of resources.

A quantitative reward metric can be obtained from the reward estimators 339, or from ground truth of a simulation scenario that is provided out-of-band. Outputs of the observation space 338 and the reward estimators 339 are stored as observations and rewards 331 in a storage 330. The observations and rewards 331 are used by policy optimization 332 to adjust policies 333, which are used to select the best actions for one or more controllers 319. Based on information from the adjusted policies 331, action selection 334 selects actions for the controllers that are expected to produce the best possible signal/data information 301, e.g., information about signals and emitters in the environment that achieve the target rewards.

In some implementations, the system 300 functions as a learning and action selection system. In such implementations, the signal and/or data information 301 includes received information bits and/or packets, which are provided as information output to some other radio system or user that seeks to receive information transmitted over the RF In signal. In these implementations, the observation space 338 includes observations about properties of the signal and the transmission channel, such as the channel response, power spectrum, time domain signal, spatial information about transmitter(s) and receiver(s), current controller settings, historical information, or other information describing the RF In, the information output, and their properties. The reward estimators 339 include information estimated or known through other means about various metrics, such as the bit error rate (BER), frame error rate (FER), symbol error distance, packet drop rate, spectral efficiency, or other statistics that measure the quality or performance of the radio communications channel. As described above, the observations and rewards 331 are used by the policy optimization

432 to adjust one or more policies 333, which predict actions by action selection 434 to best operate the system 300.

In some implementations, the system 300 includes a radio transmitter and a series of radio transmitter stages 309 that correspond to the radio stages 109, but for transmission operations, e.g., information flow in the reverse direction terminating at the antenna. In such implementations, receivers and transmitter sub-systems operate as one system controlled by a single set of policies. The observations include information about the status of receive and transmit radio stages, and actions include changes to operational settings of the transmit and receive stages, or manipulation or control of receive or transmit radio waveforms (e.g., by controlling modulators, demodulators, sensing tools, or signal generators), or both.

As an example, in some implementations, the radio communications system 100 (or the radio communications system 300) utilizes deep reinforcement learning (RL) to train the machine-learning networks that implement the policies 133 (or the policies 333, respectively). In these implementations, the deep RL enables naive learning of the radio signal parameter search space by the policies 133, without requiring recourse to expert features, heuristics, or search strategies. For example, the policies 133 are realized in some cases by a DNN-based function approximation learner, e.g., a general-purpose open source DNN-based Q-learning function approximation learner (Q represents a value function, with the value being a target reward or objective). The corresponding policies 133 can rapidly explore the search space for the optimal radio control parameters, using a set of discrete actions and observations. For example, in some cases, an encoder is directly adapted as a result of reinforcement learning (e.g., the policies 133 directly change the encoder encoding). In some implementations, RL algorithms such as actor-critic methods are applied to realize one or more ANNs for several policy networks, which seek to predict, based on experience and exploration, one or more of reward, discounted reward, advantage, or next state, among others, to assist in optimal action selection.

Examples of the system 300, or the system 100, or both, include: a radio spectrum monitoring system, a spectrum regulatory monitoring system, a radio frequency interference monitoring system, or an ISR system, which implement the machine learning described above to direct radio processing resources to be used more effectively to achieve high-level tasks through resource allocation and scheduling. Another example of the system 300 (or the system 100) is a wireless threat detection system, in which the search process to effectively detect threats or events is guided by a control process as described above, e.g., policies 333 that are used to predict and select next action(s) taken by the controllers 319, to achieve various objectives, e.g., to minimize detection time, maximize probability of detection, or minimize probability of missed detections or false alarms, among others. As a further example, the system 300 (or the system 100) can implement machine learning policy networks to select time-frequency-spatial spectrum resources to allocate to users within a wireless system, e.g., select actions that optimally schedule resources in a multiple-input and multiple-output (MIMO), or Massive MIMO, system to achieve one or more objectives, such as to maximize user experience, aggregate throughput, minimum latency, or lowest overhead. Yet another example of the system 300 (or the system 100), as described further below, is a portable radio system, such as a wireless (e.g., cellular) phone, in which machine learning is used to optimize scheduling, radio usage, other hardware parameters, software load balancing on the device, scheduling placement on the device, among others, to achieve objectives such as maximizing battery life or user experience performance. In each of these above systems, learned policies are deployed and used without a continuing update process to control the radio system.

Figure 4:
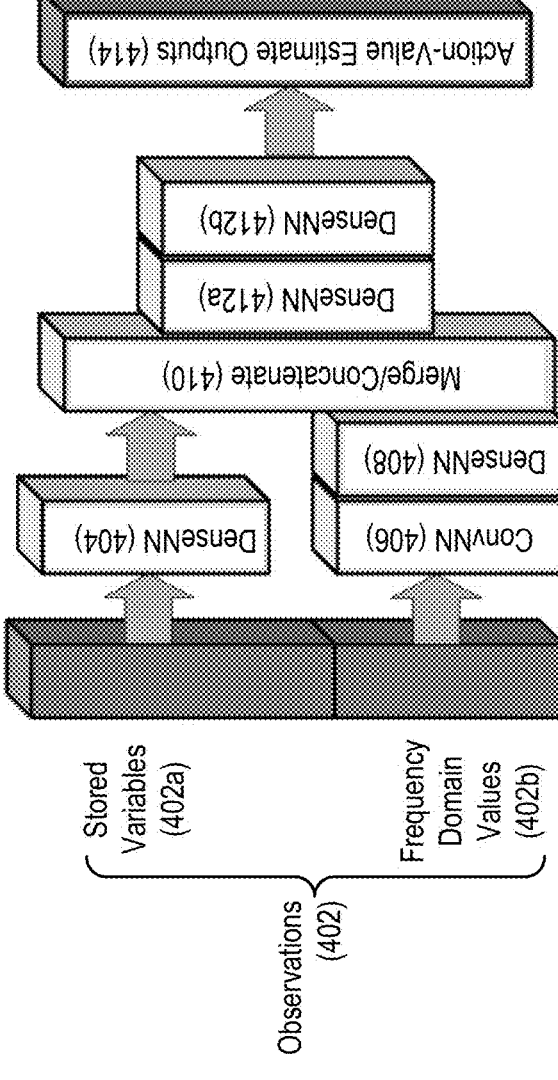
FIG. 4 illustrates an example of a network architecture that uses a deep learning to implement policies for providing action-value estimates.

FIG. 4 illustrates an example of a network architecture 400 that uses a deep learning to implement policies for providing action-value estimates. In some implementations, the network architecture 400 corresponds to a machine-learning network that executes the policies 333 (or the policies 133).

The observations 402 that are input to the network 400 include stored variables 402a, and frequency domain values 402b. In some implementations, the observations 402 are similar to observations 331, and the stored variables 402a include values obtained from storage 330. The stored variables 402a include signal information, such as center frequency and bandwidth, and previous actions. The frequency domain values 402b include current observations of the environment, e.g., a multi-point signal power spectrum. In some implementations, the frequency domain values are contiguous frequency domain values that represent the current state of the input RF signal (e.g., RF In).

The network 400 treats each of the inputs, stored variables 402a and frequency domain values 402b, as an independent discrete input with fully connected logic and applies deep learning to the values separately. For example, in some implementations, the network 400 processes the stored variables 402a using a dense neural network, DenseNN 404. The DenseNN 404 can be, for example, a time distributed dense rectified linear unit (ReLU). The network 400 processes the frequency domain values 402b using a convolutional neural network, ConvNN 406, which can be, for example, a convolutional ReLU. The output of ConvNN 406 is processed further by a DenseNN 408. By processing the frequency domain values 402b using ConvNN 406 and DenseNN 408, the network 400 reduces the parameter space to a smaller set of feasible values, while allowing frequency domain filters to form and be used shift-invariantly on the power spectrum by using a set of convolutional neural network layers.

The network 400 merges or concatenates the outputs along the two discrete paths—the activations from the DenseNN 404 and from the DenseNN 408—using merge/concatenate 410. The concatenated activations are further processed by one or more dense fully connected layers, e.g., DenseNNs 412a and 412b, to perform the output regression task for action-value estimate outputs 414. In some implementations, the output regression layer weights are zeroed to reduce initial error in value function output.

In some implementations, one or more of the DenseNNs 404, 408, 412a, or 412b, or the ConvNN 406, is a function approximation network that uses reinforcement learning in deep neural network policy network approximation, e.g., a deep-Q network that implements a parametric version of the Deep Q-Learning algorithm, Double Q-Learning algorithm, or another similar algorithm where policy is predicted by a trained neural network. The networks use one or more sets of weights for decision making. The networks may use greedy policy updates, or policy gradients (e.g., stochastic gradient descent), among others, which may reduce overestimation value bias and improve policy learning rate and stability for many tasks.

In some implementations, the network 400 implements experience replay. In such implementations, the network 400 stores a large number of previous actions, e.g., keeps around 1,000,000 previous actions in storage memory. In addition to the new experience gained each time-step, the network 400 draws training samples from the previous actions stored in memory. The number of previous actions may vary depending on the complexity of the system from smaller numbers of experiential records. For example, in some cases, tens or hundreds of previous actions are stored, with augmentation (e.g., permutations or combinations of these actions by varying one or more action parameters) to improve the actions, to a large number (e.g., thousands, millions, billions or more) of additional examples of fully simulated or massively augmented scenarios.

In some implementations, the network 400 is implemented as a graphical processor unit (GPU)-optimized deep neural network, For example, in some cases, the network 400 is a DNN that utilizes software library frameworks such as Keras, Theano, PyTorch, or TensorFlow, among other such suitable frameworks. In such cases, the network 400 is executed in a suitable processor, e.g., a GPU such as NVidia Titan X, a mobile graphics processor, a digital signal processor (DSP), a vector accelerator ARM processor, or a neuromorphic processor. In some implementations, the processor is integrated into electronic devices, such as cellular phones. For example, modern cellular phones have flexible Radio Frequency Integrated Circuits (RFIC) that have the capability for frequency tuning and digitization of relatively large arbitrary bands of interest. In some implementations, the network 400 is integrated as part of the RFIC chips of the cellular phones. In such implementations, the cellular phones are enabled to use machine learning to derive a general search policy to efficiently identify, from a large range of possibilities, RF signals that provide useful connectivity, while optimizing for various target objectives, such as minimal search time, optimal multi-user resource allocation or scheduling, minimal latency, best user experience, or minimal battery consumption and power usage. The network 400 achieves the target objectives by reducing the search into a relatively small set of possible discrete actions which may be taken towards the end-goal, using the deep neural networks as described above.

As an example of a search performed by the network 400 to find optimal RF signals for a cellular phone, in some implementations, the network 400 executes policies that are used to control a single radio receiver sampling at a bandwidth of 20 MHz. The discrete actions that can be taken by the radio controllers, e.g., radio controllers 319, include:

Freq Down (e.g., frequency down),
Freq Up (e.g., frequency up),
BW-L (e.g., bandwidth down left),
BW-R (e.g., bandwidth down right),
BW Max (e.g., bandwidth max),
Detect (e.g., assert that a signal is in the current window), and
Finished (e.g., assert that all signals in band have been detected).

The network 400 (e.g., the policies executed by the network) chooses a random frequency within the band of interest (e.g., 100 MHz to 200 MHz) to place a single sinusoidal tone. For each observation, the network 400 returns a small band-limited window into the environment that is tuned to the chosen center frequency and bandwidth. The Detect action asserts that there is a signal within the current band either correctly or falsely, while Finished asserts that system has correctly found the signal (e.g., target reward achieved) and the search path is complete. The controllers apply the bandwidth and frequency actions to change the receiver configuration according to the actions noted above.

Table 1 provides an example of three potential rewards schemes (e.g., rewards 331) for the search process described above. The network's goal at run-time is to detect the signal present somewhere in the band and localize the signal using BW-L and BW-R actions to zoom in on the signal. The rewards and penalties in Table 1 are designed to reflect that goal. In some implementations, Scheme A results in the fastest training rate and the simplest approach towards directly rewarding good actions; Scheme B provides a strong disincentive for false positive actions, but slows down learning; and Scheme C provides a simple final score which requires a more delayed-reward style of learning.

TABLE 1

| | Rewards Scheme | | |
| --- | --- | --- | --- |
| Action | Scheme A | Scheme B | Scheme C |
| Detect(True) | 1 | 1 | 0 |
| Detect(False) | 0 | −1 | 0 |
| BW-(True) | 1 | 1 | 0 |
| BW-(False) | 0 | 0 | 0 |
| Finish(True) | 1 | 1 | nfound* depth |
| Finish(False) | 0 | −1 | 0 |

The above approach can be contrasted with conventional approaches to tune cellular phones or to search for radio signals in RF monitoring systems. In conventional approaches, cellular phones are programmed simplistically, e.g., by a carrier to brute force through a small list of carrier-assigned channels and bandwidth, even though the RFIC chips are capable of tuning to relatively arbitrary center frequencies, e.g., between 100 MHz and 6 GHz and providing often powers of two decimations of a 10-20 MHz wide bandwidth. Accordingly, using machine-learning network based policies as described with respect to the implementations of FIGS. 1-4 above, more rapid, efficient and robust network connectivity and/or spectrum monitoring can be achieved for cellular phones or other spectrum applications.

In some implementations, the policies implemented by the network 400 are transparent to the underlying operating system of the corresponding device. In other implementations, the policies provide hooks (e.g., application programming interfaces or APIs) to the underlying operating system, e.g., such that the predicted actions are integrated with the operations of the operating system.

FIG. 5 is a flowchart illustrating an example method 500 for controlling processing of an RF signal using a machine-learning network. In some implementations, the method 500 is performed by a radio communications system, e.g., one of the radio communications systems 100, 200 or 300. In some implementations, the method 500 is performed by an apparatus, such as the electronic device (e.g., a cellular phone), or an embedded software radio, that implements the machine-learning network architecture 400.

The method 500 includes inputting, at 502, a first representation of a signal. For example, a radio frequency signal, RF In, is input to the radio stages 109 of the radio communications system 100, or a radio frequency signal RF In is input to the radio stages 309 of the radio communications system 300, as described above. In some implementations, a simulated radio frequency signal, Sim RF In, is input to the simulated radio stages 209.

At 504, the first representation of the signal is processed using one or more radio stages. For example, as discussed above, RF In in the system 100 is processed by one or more radio stages 109, such as one or more of: radio antenna 101, filter selection 102 hardware component, a set of programmable gain amplifiers and/or attenuators 103, a tuner 104, an ADC 105, or a digital down converter 106. Similarly, the RF In in the system 300 is processed by one or more radio stages 309, while the Sim RF In in the system 200 is processed by one or more radio stages 209.

At 506, a second representation of the signal is output from the one or more radio stages. For example, as described previously, the radio stages 109 in the system 100 produce output information 108, while the radio stages 309 in the system 300 produce output information 308.

At 508, one or more observations about the second representation of the signal is obtained. For example, the system 100 obtains, from the output information 108, observations 131 about the corresponding environment and the processed RF In signal. Similarly, the system 300 generates, from the output information 308, an observation space 338 that includes observations 331 about the respective environment and the corresponding processed RF In signal. Examples of various observations have been described previously, e.g., with respect to FIGS. 1 and 3.

At 510, one or more metrics of the second representation of the signal is measured. For example, the system 100 measures, from the output information 108, rewards 131 for the processed RF In signal. In this context, rewards correspond to metrics that are measured for the processed signal. Similarly, the system 300 measures, from the output information 308, reward estimators 339 that includes rewards 331 for the corresponding processed RF In signal. Examples of various rewards have been described previously, e.g., with respect to FIGS. 1 and 3.

At 512, past observations and metrics are accessed from storage. For example, the system 100 accesses, from the storage 130, observations and rewards that were obtained from previous iterations or runs, and that were subsequently stored in the storage 130. Similarly, the system 300 accesses, from the storage 330, observations and rewards that were obtained from previous iterations or runs, and that were subsequently stored in the storage 330. In some implementations, the system 100, or the system 300, or both, also store the present observations and rewards 131, or the observations and rewards 331, respectively, in the respective storage 130 or 330.

At 514, parameters of a machine-learning network that executes policies to process signals by controlling the radio stages are adjusted using the observations, metrics and past observations. For example, in the system 100, the policies 133 are adjusted using the observations and rewards 131, and the past experiences obtained from storage 130. The policy optimization 132 uses the observations and rewards 131, and the past experiences from storage 130, to adjust weights or connections, or both, of one or more layers of the machine-learning network that executes the policies 133. Similarly, the policies 333 in the system 300, are adjusted using the observations and rewards 331, and the past experiences obtained from storage 330. The policy optimization 332 uses the observations and rewards 331, and the past experiences from storage 330, to adjust weights or connections, or both, of one or more layers of the machine-learning network that executes the policies 133. As discussed previously by the example of FIG. 4, in some implementations, the weights and/or connections of the components of the network 400, such as one or more DenseNN 404, 408, 412*a*, 412*b*, or ConvNN 406, are adjusted using the present observations and rewards (e.g., frequency domain values 402*b*) and the present observations and rewards (e.g., stored variables 402*a*). In some implementations, e.g., in which the machine-learning network is an ANN, activation functions of one or more neurons are also adjusted.

In response to adjusting the parameters of the machine-learning network in the above manner, output provided by the machine-learning network are modified. For example, results that are generated by executing the policies, e.g., upon a run of the machine-learning network, are modified, compared to the results that would have been obtained prior to the parameter adjustments.

At 516, actions performed by one or more controllers corresponding to the radio stages are updated. For example, upon executing the policies 133 following adjustments to the parameters of the corresponding machine-learning network, the results, e.g., the output of the machine-learning network, are updated. As discussed previously, the output is a prediction of goodness (or utility) of one or more actions or sequences of actions that should be taken by one or more of the radio controllers 119 to adjust the parameters of the corresponding radio stages, to process RF In with the objective of achieving certain target values of one or more metrics of the signal. For example, the network 400 provides action-value estimate outputs 414 that predict different values of one or more target metrics that can be achieved upon taking different actions, or groups of actions. One or more of these actions or groups of actions are selected, which provide values for the metrics that are closest to target values, e.g., minimizes the differences between the target values and actual values that are obtained upon processing RF signals in subsequent runs. Based on this output, one or more next actions, which are predicted to achieve the target values of the metrics, are selected and provided to the controllers 119, e.g., by the action selection 134. Similarly, in response to the prediction of one or more next actions by executing the policies 333, the predicted actions are selected and provided to the controllers 319, e.g., by the action selection 334. In some cases, the action space includes continuous action spaces, such as real-valued tune frequencies, in addition to discrete actions (e.g. tune N Hz up or down, where N is a real number >0).

At 518, a representation of a subsequent signal is processed using the radio stages controlled by actions that include the updated actions. For example, upon receiving updated actions from action selection 134, one or more of the controllers 119 adjust parameters of their respective radio stages to be consistent with the instructions in the updated actions. Adjustment of the parameters of the radio stages 109 leads to changes in the manner the radio stages process RF signals, e.g., by tuning to a different center frequency, applying a different set of filters, using different signal processing configurations, applying a different amount of gain to the signal, among others. In some implementations, one or more of the radio stages can operate in several different modes. In such cases, the corresponding controller can switch the operational mode of a radio stage upon receiving the updated actions. An RF signal that is subsequently input to the radio stages 109 accordingly is processed differently, compared to the processing of RF signals that were input before the most recent adjustments. Similarly, upon receiving updated actions from action selection 334, one or more of the controllers 319 adjust parameters of their respective radio stages 309, which result in the radio stages 309 processing subsequent RF signals differently, compared to the processing before the most recent adjustments.

In response to processing the subsequent RF signals using the adjusted radio stages, the output information (e.g., output information 108 or output information 308) yield metrics that have values that are different from the values of metrics obtained earlier. In some implementations, the new values for the metrics are closer to the target values, or achieves the target values, as is the objective.

In some implementations, actions performed by a subset of the controllers 119 (or the controllers 319) are updated. Accordingly, the parameters of a subset of the radio stages 109 (or the radio stages 309) are adjusted. For example, the updated actions can instruct to change only the center frequency, or the amount of gain that is applied, or both, but not other parameters. Accordingly, updated actions for only the tuner controller 114, or the gain and attenuation controllers 113, are sent by action selection 134 to the implicated controllers. In response, the tuner controller 114, or the gain and attenuation controllers 113, adjust center frequency or gain parameters, respectively, of the corresponding controlled radio stages, tuner 104, or amplifier/attenuator 103, respectively. Depending on the implementation, the parameters for different radio stages can be adjusted in different instances. In some implementations, the parameters for all the radio stages are adjusted in some instances.

In response to processing the subsequent RF signals using the adjusted radio stages, the output information (e.g., output information 108 or output information 308) yield metrics that have values that are different from the values of metrics obtained earlier. In some implementations, the new values for the metrics are closer to the target values, or achieves the target values, as is the objective.

FIGS. 6A and 6B are diagrams illustrating examples of a computing device 600 and a mobile computing device 650, respectively, that can control processing of an RF signal using a machine-learning network. For example, one or more parts of a machine-learning network that executes policies for control of radio signal transmission, reception and processing hardware (e.g., radio stages 109 and controllers 119, or radios stages 309 and controller 319) could be implemented by the computing device 600 or the mobile computing device 650.

The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

As shown in FIG. 6A, the computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 602 is a single-threaded processor. In some implementations, the processor 602 is a multi-threaded processor. In some implementations, the processor 602 is a quantum computer. In some implementations, the processor 602 executes a machine-learning network corresponding to policies for control of radio signal transmission, reception and processing hardware, as described above.

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk. In some implementations, the memory 604 is similar to the memory 130, or the memory 330, e.g., the memory 604 stores past observations and storage that are used by the machine-learning network, executed by the processer 602, to control radio signal transmission, reception and processing hardware.

The storage device 606 is capable of providing mass storage for the computing device 600. In some implementations, the storage device 606 may be or include a computer-readable medium, such as a floppy disk device, a hard disk device, an optical disk device, or a tape device, a flash memory or other similar solid-state memory device, or an array of devices, including devices in a storage area network or other configurations. In some implementations, the storage device 606 is similar to the memory 130, or the memory 330, e.g., the storage device 606 stores past observations and storage that are used by the machine-learning network, executed by the processer 602, to control radio signal transmission, reception and processing hardware.

Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602). The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may include one or more of the computing device 600 and the mobile computing device 650, and an entire system may be made up of multiple computing devices communicating with each other.

As shown in FIG. 6B, the mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650. In some implementations, the processor 652 executes a machine-learning network corresponding to policies for control of radio signal transmission, reception and processing hardware, as described above. For example, the processor 652 can be an RFIC, as described with respect to FIG. 4.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

In some implementations, the memory 664 is similar to the memory 130, or the memory 330, e.g., the memory 664 stores past observations and storage that are used by the machine-learning network, executed by the processer 652, to control radio signal transmission, reception and processing hardware.

The memory 664 may include, for example, flash memory and/or NVRAM memory (non-volatile random access memory), as discussed below. In some implementations, instructions are stored in an information carrier such that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA1350, or GPRS (General Packet Radio Service), LTE, 5G/6G cellular, among others. Such communication may occur, for example, through the transceiver 668 using a radio frequency. In addition, short-range communication may occur, such as using a Bluetooth, Wi-Fi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

What is claimed is:

1. A method performed by one or more processors to control processing of radio frequency (RF) signals, the method comprising:

providing values representing a current state of a received RF signal as input to a machine learning network;

executing one or more policies of the machine learning network based on the values, to determine one or more actions to perform to control a plurality of radio stages of a radio communications apparatus, the plurality of radio stages comprising a radio antenna, and a tuner, wherein the one or more policies are associated with estimations of results of signal processing using the one or more actions, and wherein the machine learning network is configured to output an estimate of a result of a change in a center frequency of the tuner;

using a tuner controller of the radio communications apparatus, adjusting, in accordance with the estimate of the result of the change in the center frequency, the tuner to tune to a different center frequency;

receiving a first representation of an RF signal that is input to the radio communications apparatus;

processing the first representation of the RF signal using the radio antenna and the tuner in accordance with the different center frequency to which the tuner is tuned; and

based on the processing, obtaining, at an output of the plurality of radio stages, a second representation of the RF signal.

2. The method of claim 1, comprising adjusting the one or more policies of the machine learning network based on a measure of electromagnetic interference.

3. The method of claim 1, comprising adjusting the one or more policies of the machine learning network based on information about a signal emitter in an environment of the radio antenna.

4. The method of claim 1, wherein the machine learning network is configured to, based on the values representing the current state of the received RF signal, estimate respective results of increasing the center frequency and decreasing the center frequency.

5. The method of claim 1, comprising:

based on processing the first representation of the RF signal, obtaining, from the plurality of radio stages, output information describing an environment of the radio antenna;

determining one or more rewards based on the output information; and storing the output information and the one or more rewards to a storage.

6. The method of claim 5, wherein the one or more rewards are based on one or more of the following indicated by the output information: a number of signals detected in the environment, a presence of electromagnetic interference in the environment, or a type of electromagnetic interference in the environment.

7. The method of claim 1, comprising:

obtaining one or more observations about the second representation of the RF signal;

determining one or more rewards based on the one or more observations; and based on the one or more observations and the one or more rewards, adjusting the one or more policies of the machine learning network.

8. The method of claim 7, wherein adjusting the one or more policies comprises adjusting at least one of:

estimated rewards associated with actions used to control the plurality of radio stages, estimated states associated with the actions used to control the plurality of radio stages, or estimated rewards associated with states of the radio communications apparatus.

9. The method of claim 7, wherein adjusting the one or more policies comprises adjusting the one or more policies to achieve at least one target objective, wherein the at least one target objective is based on at least one of user experience, throughput, latency, overhead, detection time for particular RF signals, identification of particular types of bursts for wideband extraction, resource utilization for multi-user capacity, signal detection robustness, signal detection speed, identification or reception of a radio signal or interference, mitigation of interference, bit error rate, power usage, a bandwidth requirement, processing complexity, or resource allocation.

10. The method of claim 7, wherein the machine learning network includes one of an artificial neural network (ANN), a deep dense neural network (DenseNN), or a convolutional neural network (ConvNN) comprising a series of parametric multiplications, additions, and non-linearities, and wherein adjusting the one or more policies of the machine learning network includes updating at least one of a connectivity in one or more layers of the ANN, or a weight of a connection in the one or more layers of the ANN, or adjusting parameters of the machine learning network using reinforcement learning, Deep Q-Learning, Double Q-Learning, policy gradients, or an actor critic method.

11. The method of claim 7, wherein the one or more observations include at least one of channel response information, power spectrum information, cyclic feature information, time domain information, or spatial information.

12. The method of claim 1, wherein the values representing the current state of the received RF signal comprise frequency domain values of the received RF signal.

13. The method of claim 1, wherein the machine learning network is configured to estimate a result of an allocation of time-frequency-spatial spectrum resources to users in a communications system.

14. The method of claim 1, wherein the machine learning network is configured to estimate a result of at least one of an allocation of spectrum to users in a communications system, an allocation of time to users in the communications system, an allocation of frequency to users in the communications system, or an allocation of spatial slots to users in the communications system.

15. The method of claim 1, wherein the one or more policies includes a policy to detect presence of channel interference or distortion in communications channels in a communications system.

16. The method of claim 1, wherein the radio communications apparatus includes one of a base station in a cellular communications network or a cellular phone in the cellular communications network.

17. A radio communications apparatus comprising:

a radio antenna;

a tuner an tuner controller to control operations of the tuner; and a computing device configured to perform operations comprising:

providing values representing a current state of a received RF signal as input to a machine learning network;

executing one or more policies of the machine learning network based on the values, to determine one or more actions to perform to control a plurality of radio stages of the radio communications apparatus, the plurality of radio stages comprising the radio antenna and the tuner, wherein the one or more policies are associated with estimations of results of signal processing using the one or more actions, and wherein the machine learning network is configured to output an estimate of a result of a change in a center frequency of the tuner;

using the tuner controller, adjusting, in accordance with the estimate of the result of the change in the center frequency, the tuner to tune to a different center frequency;

receiving a first representation of an RF signal that is input to the radio communications apparatus;

processing the first representation of the RF signal using the radio antenna and the tuner in accordance with the different center frequency to which the tuner is tuned; and based on the processing, obtaining, at an output of the plurality of radio stages, a second representation of the RF signal.

18. The radio communications apparatus of claim 17, wherein the operations comprise adjusting the one or more policies based on a measure of electromagnetic interference.

19. The radio communications apparatus of claim 17, wherein the operations comprise adjusting the one or more policies comprises based on information about a signal emitter in an environment of the radio antenna.

20. The radio communications apparatus of claim 17, wherein the machine learning network is configured to, based on the values representing the current state of the received RF signal, estimate respective results of increasing the center frequency and decreasing the center frequency.

* * * * *